(12) United States Patent
Knott et al.

(10) Patent No.: US 7,864,942 B2
(45) Date of Patent: Jan. 4, 2011

(54) SYSTEM AND METHOD FOR ROUTING CALLS

(75) Inventors: Benjamin Anthony Knott, Round Rock, TX (US); Robert R. Bushey, Cedar Park, TX (US); Sarah Korth, Chicago, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 232 days.

(21) Appl. No.: 11/005,498

(22) Filed: Dec. 6, 2004

(65) Prior Publication Data

US 2008/0008308 A1    Jan. 10, 2008

(51) Int. Cl.
     *H04M 7/00*      (2006.01)
     *H04M 3/00*      (2006.01)
     *H04M 5/00*      (2006.01)
     *H04M 3/42*      (2006.01)
     *H04M 1/64*      (2006.01)

(52) U.S. Cl. .............. 379/221.01; 379/88.01; 379/211.02; 379/212.01; 379/273

(58) Field of Classification Search ............ 379/221.01, 379/266.1, 32.01, 88.18, 265.09, 88.01, 88.21, 379/114.19, 88.04, 211.02, 283, 282, 273, 379/212.01; 370/352; 704/251, 231, 275; 709/219

See application file for complete search history.

(56) References Cited

U.S. PATENT DOCUMENTS

| | | | |
|---|---|---|---|
| 4,696,028 A | 9/1987 | Morganstein et al. | |
| 4,788,715 A | 11/1988 | Lee | |
| 4,953,204 A | 8/1990 | Cuschleg, Jr. et al. | |
| 4,964,077 A | 10/1990 | Eisen et al. | |
| 4,967,405 A | 10/1990 | Upp et al. | |
| 5,042,006 A | 8/1991 | Flohrer | |
| 5,235,679 A | 8/1993 | Yoshizawa et al. | |
| 5,335,269 A | 8/1994 | Steinlicht | |
| 5,416,830 A * | 5/1995 | MacMillan et al. | ...... 379/88.01 |
| 5,455,903 A | 10/1995 | Jolissaint et al. | |
| 5,497,373 A | 3/1996 | Hulen et al. | |
| 5,522,046 A | 5/1996 | McMillen et al. | |
| 5,530,744 A | 6/1996 | Charalambous et al. | |
| 5,546,542 A | 8/1996 | Cosares et al. | |

(Continued)

FOREIGN PATENT DOCUMENTS

EP      0 424 015 A2      4/1991

(Continued)

OTHER PUBLICATIONS

U.S. Appl. No. 10/898,722, filed Jul. 23, 2004.

(Continued)

*Primary Examiner*—Thjuan K Addy
(74) *Attorney, Agent, or Firm*—Toler Law Group

(57) ABSTRACT

A method and system of routing calls. In a particular embodiment, the method includes prompting a caller of a call for caller information with a first system. The first system has a first interface characteristic. The method further includes selecting a destination for the call based on the caller information. The destination has a second interface characteristic. The method also includes identifying a call interface characteristic change based on a difference between the first characteristic and the second characteristic, and advising the caller of the call interface characteristic change prior to routing the call.

6 Claims, 3 Drawing Sheets

U.S. PATENT DOCUMENTS

| | | |
|---|---|---|
| 5,555,299 A | 9/1996 | Maloney et al. |
| 5,590,186 A | 12/1996 | Liao et al. |
| 5,627,971 A | 5/1997 | Miernik |
| 5,632,002 A | 5/1997 | Hashimoto et al. |
| 5,652,789 A | 7/1997 | Miner et al. |
| 5,754,639 A | 5/1998 | Flockhart et al. |
| 5,754,978 A | 5/1998 | Perez-Mendez et al. |
| 5,761,432 A | 6/1998 | Bergholm et al. |
| 5,923,646 A | 7/1999 | Mandhyan |
| 5,923,745 A | 7/1999 | Hurd |
| 5,940,476 A | 8/1999 | Morganstein et al. |
| 5,946,388 A | 8/1999 | Walker et al. |
| 5,953,704 A | 9/1999 | McIlroy et al. |
| 5,974,127 A | 10/1999 | Wernli et al. |
| 5,991,756 A | 11/1999 | Wu |
| 5,995,979 A | 11/1999 | Cochran |
| 5,999,965 A | 12/1999 | Kelly |
| 6,002,689 A | 12/1999 | Christie et al. |
| 6,002,760 A | 12/1999 | Gisby |
| 6,003,011 A | 12/1999 | Sarin et al. |
| 6,038,293 A | 3/2000 | McNerney et al. |
| 6,049,594 A | 4/2000 | Furman et al. |
| 6,061,335 A | 5/2000 | De Vito et al. |
| 6,064,731 A | 5/2000 | Flockhart et al. |
| 6,118,866 A | 9/2000 | Shtivelman |
| 6,119,101 A | 9/2000 | Peckover |
| RE37,001 E | 12/2000 | Morganstein et al. |
| 6,173,042 B1 * | 1/2001 | Wu .................... 379/88.04 |
| 6,173,266 B1 | 1/2001 | Marx et al. |
| 6,173,289 B1 | 1/2001 | Sonderegger et al. |
| 6,173,399 B1 | 1/2001 | Gilbrech |
| 6,175,621 B1 | 1/2001 | Begeja |
| 6,233,313 B1 | 5/2001 | Farris et al. |
| 6,259,786 B1 | 7/2001 | Gisby |
| 6,269,153 B1 | 7/2001 | Carpenter et al. |
| 6,317,439 B1 | 11/2001 | Cardona et al. |
| 6,327,350 B1 | 12/2001 | Spangler et al. |
| 6,333,980 B1 | 12/2001 | Hollatz et al. |
| 6,353,608 B1 | 3/2002 | Cullers et al. |
| 6,366,658 B1 | 4/2002 | Bjornberg et al. |
| 6,366,668 B1 | 4/2002 | Borst et al. |
| 6,381,329 B1 | 4/2002 | Uppaluru et al. |
| 6,385,584 B1 | 5/2002 | McAllister et al. |
| 6,389,400 B1 | 5/2002 | Bushey et al. |
| 6,400,804 B1 | 6/2002 | Bilder |
| 6,400,996 B1 | 6/2002 | Hoffberg et al. |
| 6,405,159 B2 | 6/2002 | Bushey et al. |
| 6,411,687 B1 * | 6/2002 | Bohacek et al. .......... 379/88.21 |
| 6,414,966 B1 | 7/2002 | Kulkarni et al. |
| 6,418,424 B1 | 7/2002 | Hoffberg et al. |
| 6,421,433 B1 * | 7/2002 | Arsenault ............ 379/114.19 |
| 6,434,546 B1 | 8/2002 | Williamowski et al. |
| 6,442,247 B1 | 8/2002 | Garcia |
| 6,510,414 B1 | 1/2003 | Chaves |
| 6,519,562 B1 | 2/2003 | Phillips et al. |
| 6,526,126 B1 | 2/2003 | Morganstein et al. |
| 6,529,871 B1 | 3/2003 | Kanevsky et al. |
| 6,553,112 B2 | 4/2003 | Ishikawa |
| 6,553,113 B1 | 4/2003 | Dhir et al. |
| 6,570,967 B2 | 5/2003 | Katz |
| 6,574,599 B1 | 6/2003 | Lim et al. |
| 6,584,180 B2 * | 6/2003 | Nemoto .................... 379/88.01 |
| 6,584,191 B1 | 6/2003 | McPartlan et al. |
| 6,587,556 B1 | 7/2003 | Judkins et al. |
| 6,598,021 B1 | 7/2003 | Shambaugh et al. |
| 6,598,136 B1 | 7/2003 | Norrod et al. |
| 6,600,736 B1 | 7/2003 | Ball et al. |
| 6,603,854 B1 | 8/2003 | Judkins et al. |
| 6,614,781 B1 | 9/2003 | Elliott et al. |
| 6,615,248 B1 | 9/2003 | Smith |
| 6,631,186 B1 | 10/2003 | Adams et al. |
| 6,662,163 B1 | 12/2003 | Albayrak et al. |
| 6,668,241 B2 | 12/2003 | Chen et al. |
| 6,678,355 B2 | 1/2004 | Eringis et al. |
| 6,678,360 B1 | 1/2004 | Katz |
| 6,678,718 B1 | 1/2004 | Khouri et al. |
| 6,690,788 B1 | 2/2004 | Bauer et al. |
| 6,694,012 B1 | 2/2004 | Posthuma |
| 6,697,460 B2 | 2/2004 | Knott et al. |
| 6,700,972 B1 | 3/2004 | McHugh et al. |
| 6,704,404 B1 | 3/2004 | Burnett |
| 6,707,789 B1 | 3/2004 | Arslan et al. |
| 6,714,631 B1 | 3/2004 | Martin et al. |
| 6,714,643 B1 | 3/2004 | Gargeya et al. |
| 6,718,023 B1 | 4/2004 | Zolotov |
| 6,721,416 B1 | 4/2004 | Farrell |
| 6,731,722 B2 | 5/2004 | Coffey |
| 6,738,082 B1 | 5/2004 | Dong et al. |
| 6,738,473 B1 | 5/2004 | Burg et al. |
| 6,744,861 B1 | 6/2004 | Pershan et al. |
| 6,744,877 B1 | 6/2004 | Edwards |
| 6,751,306 B2 | 6/2004 | Himmel et al. |
| 6,757,306 B1 | 6/2004 | Klish, II et al. |
| 6,766,320 B1 | 7/2004 | Wang et al. |
| 6,775,359 B1 | 8/2004 | Ron et al. |
| 6,778,643 B1 | 8/2004 | Bushey et al. |
| 6,792,096 B2 | 9/2004 | Martin et al. |
| 6,807,274 B2 | 10/2004 | Joseph et al. |
| 6,823,307 B1 | 11/2004 | Steinbiss et al. |
| 6,831,932 B1 | 12/2004 | Boyle et al. |
| 6,832,224 B2 | 12/2004 | Gilmour |
| 6,842,504 B2 | 1/2005 | Mills et al. |
| 6,847,711 B2 | 1/2005 | Knott et al. |
| 6,850,611 B1 | 2/2005 | Chalk |
| 6,853,722 B2 | 2/2005 | Joseph et al. |
| 6,853,966 B2 | 2/2005 | Bushey et al. |
| 6,859,529 B2 | 2/2005 | Duncan et al. |
| 6,871,212 B2 | 3/2005 | Khouri et al. |
| 6,879,683 B1 | 4/2005 | Fain et al. |
| 6,885,734 B1 | 4/2005 | Eberle et al. |
| 6,891,932 B2 | 5/2005 | Bhargava et al. |
| 6,892,169 B1 | 5/2005 | Campbell et al. |
| 6,895,083 B1 | 5/2005 | Bers et al. |
| 6,901,366 B1 | 5/2005 | Kuhn et al. |
| 6,907,119 B2 | 6/2005 | Case et al. |
| 6,915,246 B2 | 7/2005 | Gusler et al. |
| 6,925,155 B2 | 8/2005 | Reynolds et al. |
| 6,963,983 B2 | 11/2005 | Munson et al. |
| 6,970,554 B1 * | 11/2005 | Peterson et al. .......... 379/266.1 |
| 7,003,079 B1 * | 2/2006 | McCarthy et al. ........ 379/32.01 |
| 7,006,605 B1 | 2/2006 | Morganstein et al. |
| 7,027,975 B1 | 4/2006 | Pazandak et al. |
| 7,039,166 B1 * | 5/2006 | Peterson et al. .......... 379/88.18 |
| 7,062,505 B2 | 6/2006 | Lane et al. |
| 7,076,049 B2 | 7/2006 | Bushey et al. |
| 7,106,850 B2 * | 9/2006 | Campbell et al. ...... 379/265.09 |
| 7,142,652 B2 | 11/2006 | Ho |
| 7,177,792 B2 | 2/2007 | Knight et al. |
| 7,197,130 B2 | 3/2007 | Paden et al. |
| 7,200,614 B2 | 4/2007 | Reid et al. |
| 7,487,095 B2 * | 2/2009 | Hill et al. ................... 704/275 |
| 2001/0011211 A1 | 8/2001 | Bushey et al. |
| 2001/0018672 A1 | 8/2001 | Petters et al. |
| 2001/0021948 A1 | 9/2001 | Khouri et al. |
| 2001/0032229 A1 | 10/2001 | Hulls et al. |
| 2001/0033570 A1 | 10/2001 | Makam et al. |
| 2001/0034662 A1 | 10/2001 | Morris |
| 2002/0046030 A1 | 4/2002 | Haritsa et al. |
| 2002/0049874 A1 | 4/2002 | Kimura |
| 2002/0057678 A1 | 5/2002 | Jiang et al. |
| 2002/0059164 A1 | 5/2002 | Shtivelman |
| 2002/0059169 A1 | 5/2002 | Quarterman et al. |
| 2002/0067714 A1 | 6/2002 | Crain et al. |
| 2002/0087385 A1 | 7/2002 | Vincent |

| | | |
|---|---|---|
| 2002/0114432 A1 | 8/2002 | Shaffer et al. |
| 2002/0133394 A1 | 9/2002 | Bushey et al. |
| 2002/0133413 A1 | 9/2002 | Chang et al. |
| 2002/0135618 A1 | 9/2002 | Maes et al. |
| 2002/0156699 A1 | 10/2002 | Gray et al. |
| 2002/0165732 A1 | 11/2002 | Ezzeddine et al. |
| 2002/0196277 A1 | 12/2002 | Bushey et al. |
| 2003/0018659 A1 | 1/2003 | Fuks et al. |
| 2003/0026409 A1 | 2/2003 | Bushey et al. |
| 2003/0035381 A1 | 2/2003 | Chen et al. |
| 2003/0035516 A1 | 2/2003 | Guedalia |
| 2003/0069937 A1 | 4/2003 | Khouri et al. |
| 2003/0097428 A1 | 5/2003 | Afkhami et al. |
| 2003/0103619 A1 | 6/2003 | Brown et al. |
| 2003/0112956 A1* | 6/2003 | Brown et al. ........... 379/221.01 |
| 2003/0114105 A1 | 6/2003 | Haller et al. |
| 2003/0115289 A1* | 6/2003 | Chinn et al. ................ 709/219 |
| 2003/0118159 A1 | 6/2003 | Shen et al. |
| 2003/0130864 A1 | 7/2003 | Ho et al. |
| 2003/0143981 A1 | 7/2003 | Kortum et al. |
| 2003/0144846 A1 | 7/2003 | Denenberg et al. |
| 2003/0144919 A1 | 7/2003 | Trompette et al. |
| 2003/0156133 A1 | 8/2003 | Martin et al. |
| 2003/0165223 A1 | 9/2003 | Timmins et al. |
| 2003/0187732 A1 | 10/2003 | Seta |
| 2003/0187773 A1 | 10/2003 | Santos et al. |
| 2003/0194063 A1 | 10/2003 | Martin et al. |
| 2003/0195753 A1 | 10/2003 | Homuth |
| 2003/0202640 A1 | 10/2003 | Knott et al. |
| 2003/0202643 A1 | 10/2003 | Joseph et al. |
| 2003/0202649 A1 | 10/2003 | Haug, Jr. et al. |
| 2003/0204435 A1 | 10/2003 | McQuilkin et al. |
| 2003/0228007 A1 | 12/2003 | Kurosaki |
| 2003/0235282 A1 | 12/2003 | Sichelman et al. |
| 2003/0235287 A1 | 12/2003 | Margolis |
| 2004/0005047 A1 | 1/2004 | Joseph et al. |
| 2004/0006473 A1 | 1/2004 | Mills et al. |
| 2004/0032862 A1 | 2/2004 | Schoeneberger et al. |
| 2004/0032935 A1 | 2/2004 | Mills et al. |
| 2004/0042592 A1 | 3/2004 | Knott et al. |
| 2004/0044950 A1 | 3/2004 | Mills et al. |
| 2004/0066401 A1 | 4/2004 | Bushey et al. |
| 2004/0066416 A1 | 4/2004 | Knott et al. |
| 2004/0073569 A1 | 4/2004 | Knott et al. |
| 2004/0083479 A1 | 4/2004 | Bondarenko et al. |
| 2004/0088285 A1 | 5/2004 | Martin et al. |
| 2004/0103017 A1 | 5/2004 | Reed et al. |
| 2004/0109555 A1 | 6/2004 | Williams |
| 2004/0120473 A1 | 6/2004 | Birch et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0162724 A1* | 8/2004 | Hill et al. .................... 704/231 |
| 2004/0174980 A1 | 9/2004 | Knott et al. |
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2005/0008141 A1 | 1/2005 | Kortum et al. |
| 2005/0015197 A1 | 1/2005 | Ohtsuji et al. |
| 2005/0015744 A1 | 1/2005 | Bushey et al. |
| 2005/0027535 A1 | 2/2005 | Martin et al. |
| 2005/0041796 A1 | 2/2005 | Joseph et al. |
| 2005/0047578 A1 | 3/2005 | Knott et al. |
| 2005/0055216 A1 | 3/2005 | Bushey et al. |
| 2005/0058264 A1 | 3/2005 | Joseph et al. |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0111653 A1* | 5/2005 | Joyce et al. ............. 379/265.09 |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0141692 A1 | 6/2005 | Scherer et al. |
| 2005/0147218 A1 | 7/2005 | Novack et al. |
| 2005/0169441 A1 | 8/2005 | Yacoub et al. |
| 2005/0169453 A1 | 8/2005 | Knott et al. |
| 2005/0201547 A1 | 9/2005 | Burg et al. |
| 2005/0213743 A1* | 9/2005 | Huet et al. ............. 379/265.09 |
| 2005/0240411 A1 | 10/2005 | Yacoub |
| 2006/0018443 A1 | 1/2006 | Knott et al. |
| 2006/0023863 A1 | 2/2006 | Joseph et al. |
| 2006/0026049 A1 | 2/2006 | Joseph et al. |
| 2006/0036437 A1 | 2/2006 | Bushey et al. |
| 2006/0039547 A1 | 2/2006 | Klein et al. |
| 2006/0050865 A1 | 3/2006 | Kortum et al. |
| 2006/0056406 A1 | 3/2006 | Bouchard et al. |
| 2006/0062375 A1 | 3/2006 | Pasquale et al. |
| 2006/0083357 A1* | 4/2006 | Howell et al. ............ 379/88.04 |
| 2006/0093097 A1 | 5/2006 | Chang |
| 2006/0100998 A1 | 5/2006 | Edwards et al. |
| 2006/0109974 A1 | 5/2006 | Paden et al. |
| 2006/0115070 A1 | 6/2006 | Bushey et al. |
| 2006/0126808 A1 | 6/2006 | Dallessandro et al. |
| 2006/0126811 A1 | 6/2006 | Bushey et al. |
| 2006/0133587 A1 | 6/2006 | Bushey et al. |
| 2006/0153345 A1 | 7/2006 | Bushey et al. |
| 2006/0159240 A1 | 7/2006 | Bushey et al. |
| 2006/0161431 A1 | 7/2006 | Sabourin et al. |
| 2006/0165066 A1* | 7/2006 | Campbell et al. ........... 370/352 |
| 2006/0177040 A1 | 8/2006 | Mitra |
| 2006/0188087 A1 | 8/2006 | Kortum et al. |
| 2006/0195312 A1 | 8/2006 | Knight et al. |
| 2006/0215831 A1 | 9/2006 | Knott et al. |
| 2006/0215833 A1 | 9/2006 | Dallessandro et al. |
| 2006/0291642 A1 | 12/2006 | Bushey et al. |
| 2008/0154601 A1* | 6/2008 | Stifelman et al. ........... 704/251 |

FOREIGN PATENT DOCUMENTS

| | | |
|---|---|---|
| EP | 0 424 015 A3 | 4/1991 |
| EP | 0 424 015 B1 | 4/1991 |
| EP | 0 876 652 A4 | 9/1996 |
| WO | WO 97/26612 | 7/1997 |
| WO | WO 01/37539 A2 | 5/2001 |
| WO | WO 01/37539 A3 | 5/2001 |
| WO | WO 2004/017584 | 2/2004 |
| WO | WO 2004/049222 A2 | 6/2004 |

OTHER PUBLICATIONS

U.S. Appl. No. 10/901,926, filed Jul. 28, 2004.
U.S. Appl. No. 10/901,925, filed Jul. 28, 2004.
U.S. Appl. No. 10/917,233, filed Aug. 12, 2004.
U.S. Appl. No. 10/935,726, filed Sep. 7, 2004.
U.S. Appl. No. 10/999,199, filed Nov. 29, 2004.
U.S. Appl. No. 10/975,023, filed Oct. 27, 2004.
U.S. Appl. No. 11/005,494, fired Dec. 6, 2004.
U.S. Appl. No. 11/010,633, filed Dec. 13, 2004.
U.S. Appl. No. 11/032,495, filed Jan. 10, 2005.
U.S. Appl. No. 11/036,204, filed Jan. 14, 2005.
U.S. Appl. No. 11/036,201, filed Jan. 14, 2005.
U.S. Appl. No. 11/062,100, filed Feb. 18, 2005.
U.S. Appl. No. 11/071,068, filed Mar. 3, 2005.
U.S. Appl. No. 11/086,796, filed Mar. 23, 2005.
U.S. Appl. No. 11/129,051, filed May 13, 2005.
U.S. Appl. No. 11/145,513, filed Jun. 3, 2005.
U.S. Appl. No. 11/173,227, filed Jul. 1, 2005.
U.S. Appl. No. 11/176,972, filed Jul. 7, 2005.
U.S. Appl. No. 11/086,794, filed Mar. 22, 2005.
U.S. Appl. No. 10/996,127, filed Nov. 23, 2004.
U.S. Appl. No. 10/920,719, filed Dec. 13, 2004.
U.S. Appl. No. 10/920,720, filed Aug. 18, 2004.
U.S. Appl. No. 10/948,089, filed Sep. 23, 2004.

U.S. Appl. No. 10/979,784, filed Nov. 2, 2004.

U.S. Appl. No. 11/212,939, filed Aug. 25, 2005.

Dan Whitecotton, et al., System and Method of Managing Calls to a Custom Call Service Center, U.S. Appl. No. 11/200,870, filed Aug. 10, 2005.

Jeffrey L. Brandt, et al., System and Method of Managing Incoming Telephone Calls at a Call Center, U.S. Appl. No. 11/214,451, filed Aug. 29, 2005.

Jeffrey L. Brandt, et al., System and Method of Managing Calls at a Call Center, U.S. Appl. No. 11/267,593, filed Nov. 4, 2005.

Benjamin A. Knott, et al., System and Method for Routing Calls, U.S. Appl. No. 11/005,498, filed Dec. 6, 2004.

Philip T. Kortum, et al., System and Method for on Hold Caller-Controlled Activities and Entertainment, U.S. Appl. No. 11/071,068, filed Mar. 3, 2005.

Robert R. Bushey, et al., System and Method for Determining Call Treatment of Repeat Calls, U.S. Appl. No. 11/129,051, filed May 13, 2005.

Robert R. Bushey, et al., Call Routing System and Method of Using the Same, U.S. Appl. No. 11/145,513, filed Jun. 3, 2005.

Robert Bushey, System and Method of Automated Order Status Retrievel, U.S. Appl. No. 11/173,227, filed Jul. 1, 2005.

Benjamin A. Knott, et al., System and Method for Automated Performance Monitoring For a Call Servicing System, U.S. Appl. No. 11/176,972, filed Jul. 7, 2005.

Julie Idler, et al., System and Method to Access Content From a Speech-Enabled Automated System, U.S. Appl. No. 11/212,939, filed Aug. 25, 2005.

Ogino, Tsukasa, et al., "Technologies for Internet Infrastructure: Eliminating the World Wide Wait," iNet Japan, Jul. 18-21, 2000, www.isoc.org/inet2000/cdproceedings/1g/index.

www.yahoo.com (as in Dec. 12, 1998) as archived in the Internet archive (www.archive.org).

International Search Report and Written Opinion of the International Searching Authority for International Application No. PCT/05/43789, mailed on Jul. 30, 2008.

* cited by examiner

SYSTEM AND METHOD FOR ROUTING CALLS

FIELD OF THE DISCLOSURE

The present disclosure relates generally to automatic call routing systems and more particularly, to call transfers in an automatic call routing system.

BACKGROUND

Automatic call routing (ACR) systems are commonplace for businesses that process high call volumes. A goal of an ACR system is to determine why a customer is calling and to route the customer to an appropriate service department. In order for an ACR system to properly route calls, the ACR system generally interprets the intent of the customer, identifies the type or category of the customer call, and selects a routing destination. Speech recognition technology generally allows an ACR system to recognize natural language statements so that the caller does not have "key-in" the caller's intent. "Keying-in" data on a cell phone while driving can be a dangerous and cumbersome task. There are many different technologies that can be utilized to implement ACR systems and these technologies are often commingled on a single call. For example, a caller may first be greeted by a main ACR system that recognizes a caller's "natural language" and then transferred to an ACR sub-system that can only process touch-tone inputs. When a caller is moved between ACR systems, the change in contexts or interface characteristics can confuse the caller, reducing the call processing efficiency. Hence, there is a need for an improved automatic call routing system.

DETAILED DESCRIPTION OF THE DRAWINGS

Summary

A method and system are disclosed for informing a caller of interface characteristics while transferring and routing calls. A call is received from a caller and the caller is prompted for information using a dialog system. The dialog (prompting) system may have a first channel, a first modality, and a first persona. Generally, the channel can be a live human interface, a recorded voice, or a digitally synthesized voice, and the modality can be a speech recognition system or a touch-tone recognition system. The persona can be different voice characters with different voice qualities, such as pitch or tone, male or female, etc. Next, the system selects a destination (a second dialog) system for the call based on the caller information. Information or data regarding the difference in interface characteristics (e.g., the channel, modality and persona) is retrieved from a memory. When the selected destination or the second dialog system has different characteristics than the first dialog system, the caller is advised, prior to the transfer of the call, of the characteristics of the new destination. The caller is informed of and prepared to communicate with the second dialog system.

Detailed Description

Figure 1:
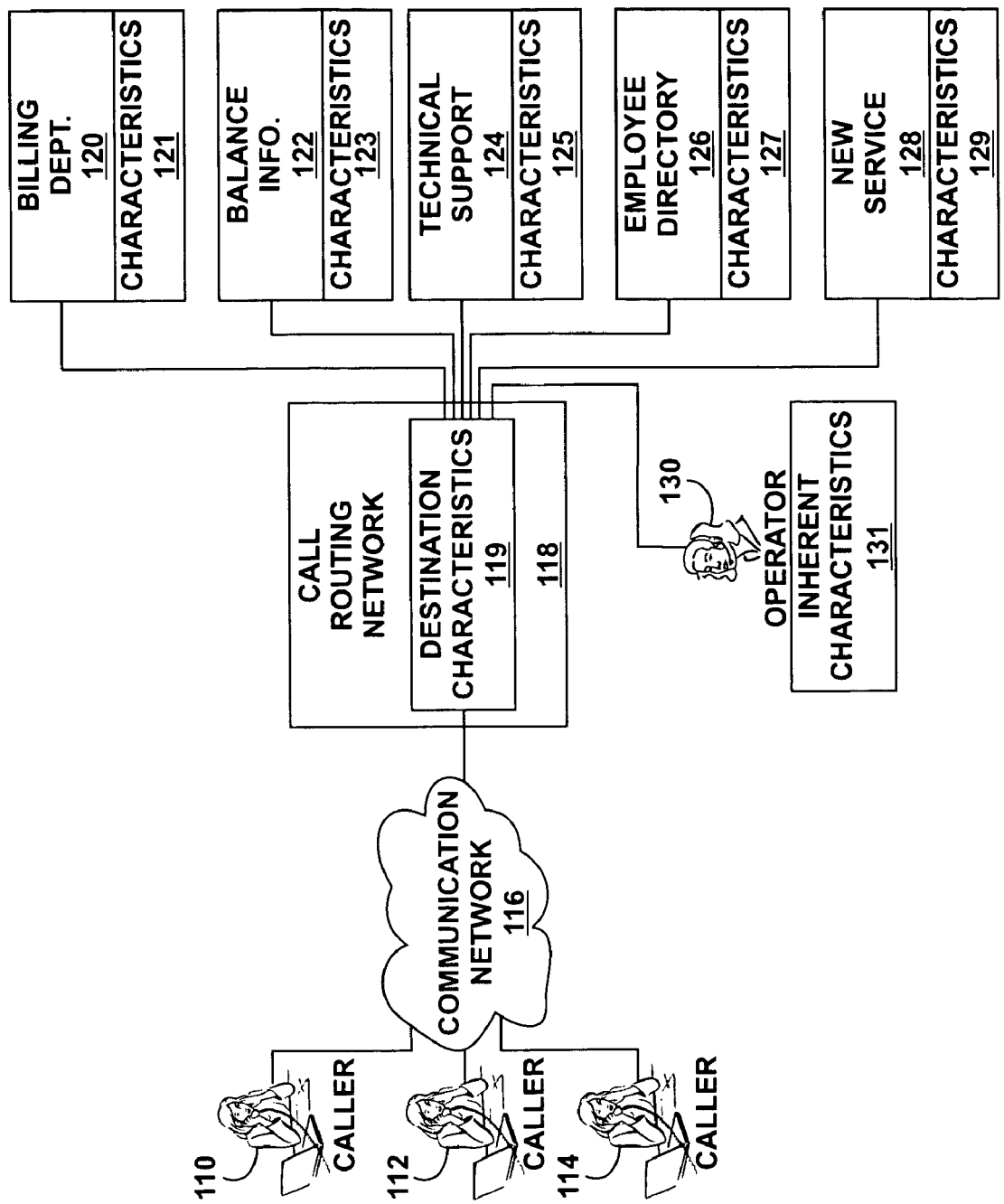
FIG. 1 illustrates a simplified configuration of a telecommunication system.

Referring to FIG. 1, an illustrated system 100 including a call center support system 118 is depicted. The system 100 includes a communication network 116, a call service support system 118, such as a call routing network, including one or more interactive voice response systems, and a plurality of potential destinations for a call. Illustrative destinations include a billing department 120, a balance information department 122, a technical support department 124, an employee directory 126, and a new customer service 128. Each department 120-128 has interface characteristics illustrated by reference characters 121-129, respectively. In addition, the call routing network 118 may route calls to an agent, such as the illustrated live operator 130 with inherent characteristics 131. An illustrative embodiment of the call support system 118 may be a call center having a plurality of agent terminals attached. Thus, while only a single operator 130 is shown, it should be understood that a plurality of different agent terminals or types of terminals may be coupled to the interactive voice response system 118, such that a variety of agents may service incoming calls. The communication network 116 receives calls from a variety of callers such as the illustrated callers 110, 112, and 114. In a particular embodiment, the communication network 116 may be a public telephone network or may be provided by a voice over Internet protocol (VoIP) type network.

Each destination entity receiving a routed call has interface characteristics. In a particular embodiment, the interface characteristics can be classified generally as channel, modality, and persona. A channel can be a live human interface, a recorded analog voice, or a digitally synthesized voice. A modality can be a speech recognition system or a touch-tone recognition system. A persona can be different characters having different voices or audio qualities, such as pitch or tone, male, or female, etc. The call support system 118 includes a destination characteristic table 119 that can be a compilation of the interface characteristics 121-131 of each of the destination call centers 120-128 and human agent 130, respectively. For example, while the call support system 118 can utilize a natural language interface, the billing department 120 may use a touch-tone mode and the balance information department 122 may use an interface having a speech recognition modality with a synthesized female voice. While an exemplary sample of characteristics and how they can be classified has been disclosed, different or additional characteristics and classifications may also be used and are within the scope of the present invention.

The call support system 118 can store the destination interface characteristics 121-131 respectively in a characteristics table 119, such as in a computer memory. The call support system 118 can determine the difference in characteristics that will be experienced by the caller as the caller is transferred from the system 118 to a selected destination. Based on the different characteristics that will be encountered by the caller, the call support system 118 can store a message in characteristics table 119 that can be communicated to the caller. The message can provide an explanation of the change in interface characteristics that will be encountered by the caller.

Figure 2:
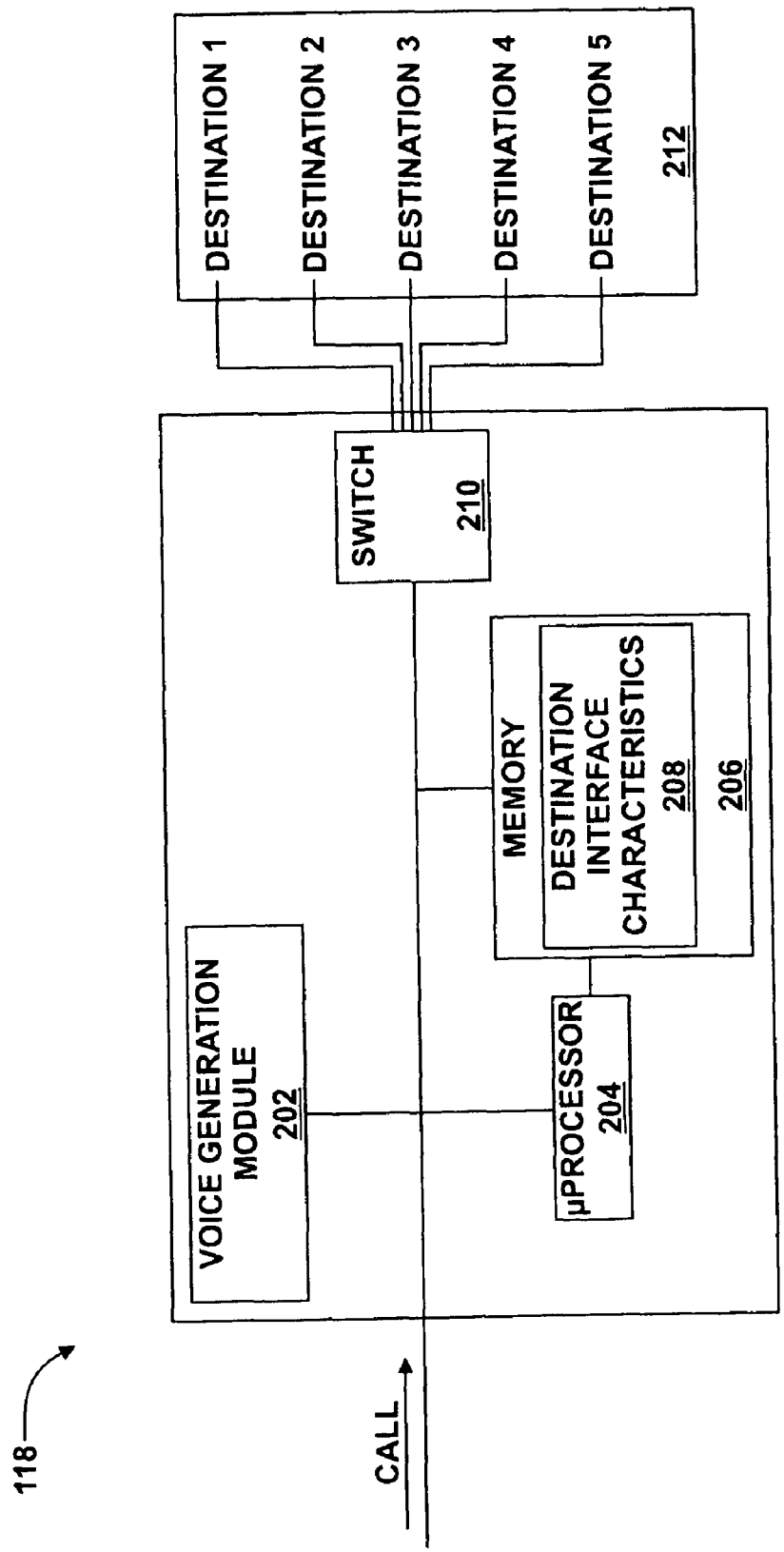
FIG. 2 illustrates a simplified configuration of an automatic call routing system.

Referring to FIG. 2, a simplified block diagram of a call support system 118 is depicted. The call support system 118 can include a voice generation module 202, a microprocessor 204, a memory 206, a destination characteristics table 208 included in the memory 208, and a switch 210. The call support system 118 can be coupled to a plurality of destinations, as illustrated by block 212. The destinations 212 can be the destinations, as illustrated by departments 120-128 in FIG. 1. The microprocessor 204 can control call processing by retrieving and executing instructions in memory 206 and by activating the voice generation module 202 to produce audio for an incoming call. Microprocessor 204 can also control switch 210 to route the call to one of the destinations 212. When the destination of a call is selected or determined based on the caller information, the microprocessor 204 obtains data from memory, such as the destination characteristics table 208.

In response to the interface characteristics, the processor 204 can determine if the destination has similar or different interface characteristics or by referencing the table 208. If a destination 212 to which the call will be routed has different characteristics, the microprocessor 204 initiates the voice generation module 202 to notify the caller of the change in characteristics. For example, the voice generating module 202 in response to an incoming call, may submit, "May I help you?" Wherein the caller responds, "I've got a question about my bill." The voice generating module 202 replies, "I think I understand. You would like to go over some charges on your bill, is that right?" In response, the caller says, "Yes." Then, the voice generating module 202 says, "Okay, we will route you to an automated system that can provide your bill balance. You will have to use the buttons or the keypad to use this system. I will connect you now." In this example, the call support system 118 switches the caller from a first system with speech recognition system to a second system with touch-tone recognition. Thus, the modality of the call processing system was changed. Informing the caller of changes in interface, such as a change in modality, persona, or channels provides improved call routing performance, often leading to fewer dropped calls.

Figure 3:
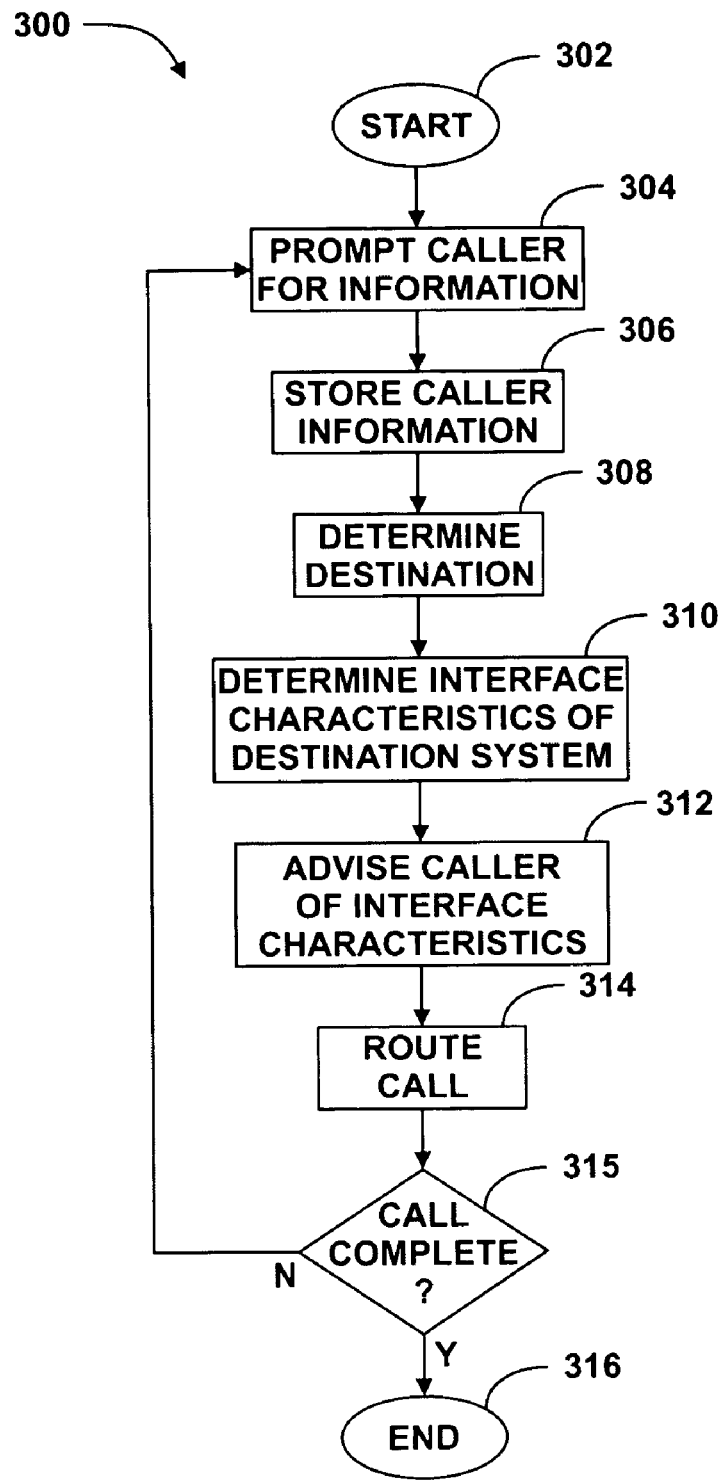
FIG. 3 is a flow diagram that illustrates a method of call processing operation.

Referring to FIG. 3, a method of operation 300 that may be used in connection with the system 100 of FIG. 1 is illustrated. The method starts at 302 and proceeds to step 304. At step 304, a caller is greeted and prompted for information. Caller information is received and stored, at step 306, and the method selects a destination for the call based on the received caller information, at 308. At step 310, a prompt message is selected to be played. The prompt message may be based on a difference between the interface characteristics of the current system (in this case the initial receiving system) and the interface characteristics of a selected destination system. Discontinuity in characteristics such as channel, modality, or persona can be determined by referencing a look-up table. The message may inform the caller of one or more interface characteristics of the destination system or of changes in interface characteristics that will be experienced by the caller prior to the next dialog. Next, at step 312, the caller can be advised of the changes in interface characteristics that may be encountered in the dialog with the selected destination system. However, if the next dialog or the downstream interface has characteristics that are the same or similar to the current dialog characteristics, the method may be silent and provide a transition that is transparent to the caller. A dialog can be defined as any interaction between a caller and an ACR. At step 314, the call is routed or transferred to the destination system. Caller information, such as the information previously stored at step 306, can be sent to the destination with the call. At decision step 315, it is determined whether servicing of the call has been completed. If call servicing has not been completed, then the method returns to step 304 where a caller is prompted for further information and the process repeats. If call service is completed, the method ends, at block 316.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of routing a call comprising:
    prompting a caller for caller information with a first system, the first system having a voice recognition modality;
    receiving, via the first system, a first natural language input from the caller;
    selecting a destination for the call based on the first natural language input, the destination having a touch tone recognition modality;
    prompting the caller to confirm the selected destination with the first system;
    upon receipt of a second natural language input from the caller confirming the selected destination, informing the caller that the selected destination is a touch tone recognition system prior to routing the call to the selected destination.

2. The method of claim 1, further comprising transmitting caller data with the call.

3. The method of claim 1, further comprising notifying the caller of forthcoming events.

4. The method of claim 1, further comprising referencing a table to determine a difference between the voice recognition modality and the touch tone recognition modality.

5. The method of claim 1, further comprising selecting a first prompt based on the voice recognition modality.

6. The method of claim 1, wherein a modality of the destination is stored in a destination characteristics table that is accessible by the first system.

* * * * *